US009251126B1

(12) United States Patent
Grieve et al.

(10) Patent No.: US 9,251,126 B1
(45) Date of Patent: Feb. 2, 2016

(54) SYSTEM AND METHOD FOR USING PRE-DEFINED CHARACTER RANGES TO DENOTE DOCUMENT FEATURES

(75) Inventors: Andrew Alexander Grieve, Waterloo (CA); John Day-Richter, Denver, CO (US)

(73) Assignee: GOOGLE INC., Mountain View, CA (US)

( * ) Notice: Subject to any disclaimer, the term of this patent is extended or adjusted under 35 U.S.C. 154(b) by 1084 days.

(21) Appl. No.: 13/297,500

(22) Filed: Nov. 16, 2011

(51) Int. Cl.
*G06F 17/00* (2006.01)
*G06F 17/22* (2006.01)

(52) U.S. Cl.
CPC ................................ *G06F 17/2217* (2013.01)

(58) Field of Classification Search
CPC .................................................. G06F 17/2217
See application file for complete search history.

(56) References Cited

U.S. PATENT DOCUMENTS

| | | | | |
|---|---|---|---|---|
| 5,784,069 | A * | 7/1998 | Daniels et al. | 345/467 |
| 6,311,180 | B1 * | 10/2001 | Fogarty | 707/749 |
| 6,980,213 | B1 | 12/2005 | Hirose et al. | |
| 7,132,962 | B1 * | 11/2006 | Degenhardt et al. | 341/50 |
| 7,143,342 | B1 * | 11/2006 | Baweja et al. | 715/207 |
| 7,278,100 | B1 * | 10/2007 | Ehrman | 715/264 |
| 7,523,223 | B2 * | 4/2009 | Chen et al. | 709/246 |
| 7,739,658 | B2 * | 6/2010 | Watson et al. | 717/108 |
| 2002/0052902 | A1 * | 5/2002 | Bauer | 707/536 |
| 2003/0018668 | A1 * | 1/2003 | Britton et al. | 707/513 |
| 2003/0052902 | A1 * | 3/2003 | Yu | 345/684 |
| 2006/0107206 | A1 | 5/2006 | Koskimies | |
| 2009/0043741 | A1 | 2/2009 | Kim | |
| 2010/0114923 | A1 | 5/2010 | McVady et al. | |
| 2011/0029103 | A1 | 2/2011 | Mann et al. | |

OTHER PUBLICATIONS

"Private-Use Characters, Noncharacters & Sentinels Faq", p. 1-10, copyright 1991-2015 Unicode, Inc., available at http://www.unicode.org/faq/private_use.html.*
Sargent, "Unicode Nearly Plain-Text Encoding of Mathematics Version 3" Publisher Text Services, Microsoft Corporation , Mar. 2010, Unicode Technical Note 28, p. 1-49.*
(Author Unknown), "Unicode," Wikipedia, dated Sep. 28, 2011 (obtained online on Oct. 5, 2011 from http://en.wikipedia.org/wiki/Unicode), pp. 1-23.

* cited by examiner

*Primary Examiner* — Amelia Tapp
(74) *Attorney, Agent, or Firm* — Ropes & Gray LLP (57) ABSTRACT

A request for a document from a mobile device via a network is received. In response to the request, within the document a non-textual document element unrecognizable to the mobile device is identified. Within the document, at a first location associated with the non-textual document element, a start marker comprising a first code selected from a predetermined Unicode range is inserted. Within the document, at a second location associated with the non-textual document element, an end marker comprising a second code selected from the predetermined Unicode range is inserted. The second code has a predetermined relationship to the first code. The document is transmitted to the mobile device via the network.

20 Claims, 8 Drawing Sheets

SYSTEM AND METHOD FOR USING PRE-DEFINED CHARACTER RANGES TO DENOTE DOCUMENT FEATURES

TECHNICAL FIELD

This specification relates generally to systems and methods for displaying document features, and more particularly to systems and methods for displaying document features using predetermined Unicode ranges.

BACKGROUND

Users of mobile devices have the ability to view webpages on their mobile browsers. Existing mobile browsers allow displaying of webpages containing documents including various features or document elements such as images and text. However, existing mobile browsers are limited compared to traditional browsers. Traditional browsers are able to support viewing of many different document elements and can be updated frequently to support the latest features. In mobile devices, updating of browsers is not as frequent as traditional browsers and as storage space is limited, it may not be feasible to update mobile browsers as frequently. Thus, updating of mobile browsers to maintain compatibility with the latest file formats can be challenging.

When existing mobile browsers are unable to recognize or interpret a document element or a portion of a document on a webpage, the mobile browsers display garbage characters or white space to the users of the mobile devices. In some instances, when mobile browsers cannot recognize a document element within the webpage, the mobile browsers may crash, reboot/restart, display a blank screen, etc. Therefore, users cannot properly view some webpages containing certain document elements and may be provided with garbage characters or their mobile browsers may crash while attempting to display the webpages containing certain document elements.

SUMMARY

In accordance with an embodiment, a request for a document from a mobile device via a network is received. In response to the request, within the document a non-textual document element unrecognizable to the mobile device is identified. Within the document, at a first location associated with the non-textual document element, a start marker comprising a first code selected from a predetermined Unicode range is inserted. Within the document, at a second location associated with the non-textual document element, an end marker comprising a second code selected from the predetermined Unicode range is inserted. The second code has a predetermined relationship to the first code. The document is transmitted to the mobile device via the network.

In one embodiment, within the document, a textual document element unrecognizable to the mobile device is identified. Within the document, at a third location associated with the textual document element, a single marker comprising a third code selected from a second predetermined Unicode range is inserted.

In another embodiment, the mobile device inserts between the first and second locations associated with the non-textual document element a graphical representation when displaying the document. The document is displayed to a user using the mobile device via a webpage.

In another embodiment, the predetermined Unicode range is dedicated for special purposes.

In another embodiment, the predetermined Unicode range falls between \uE900 to \uEFFF.

In another embodiment, the non-textual document element comprises one of an image; a photograph; a video; a chart; a table; and a graph.

In another embodiment, the first code has a first value and the second code has a second value that is one less than the first value.

In another embodiment, the first code is an odd number and the second code is an even number.

In another embodiment, request for a document from a mobile device via a network is received. In response to the request, within the document first and second document elements unrecognizable to the mobile device are identified. Within the document, at a first location associated with the first document element, a start marker comprising a first code selected from a first predetermined Unicode range is inserted. Within the document, at a second location associated with the first document element, an end marker comprising a second code selected from the first predetermined Unicode range and having a predetermined relationship to the first code is inserted. Within the document, at a third location associated with the second document element, a first marker comprising a third code selected from a second predetermined Unicode range is inserted. The document is transmitted to the mobile device via the network.

In another embodiment, the mobile device inserts between the first and second location associated with the first document element a first graphical representation and inserts at the third location associated with the second document element a second graphical representation substantially similar to the first graphical representation when displaying the document.

In another embodiment, the document is displayed to a user using the mobile device via a webpage.

In another embodiment, the first and second predetermined Unicode ranges are dedicated for special purposes.

In another embodiment, the first predetermined Unicode range falls between \uE900 to \uEFFF and the second predetermined Unicode falls between \uE900 to \uEBFF.

These and other advantages of the present disclosure will be apparent to those of ordinary skill in the art by reference to the following Detailed Description and the accompanying drawings.

DETAILED DESCRIPTION

Figure 1:
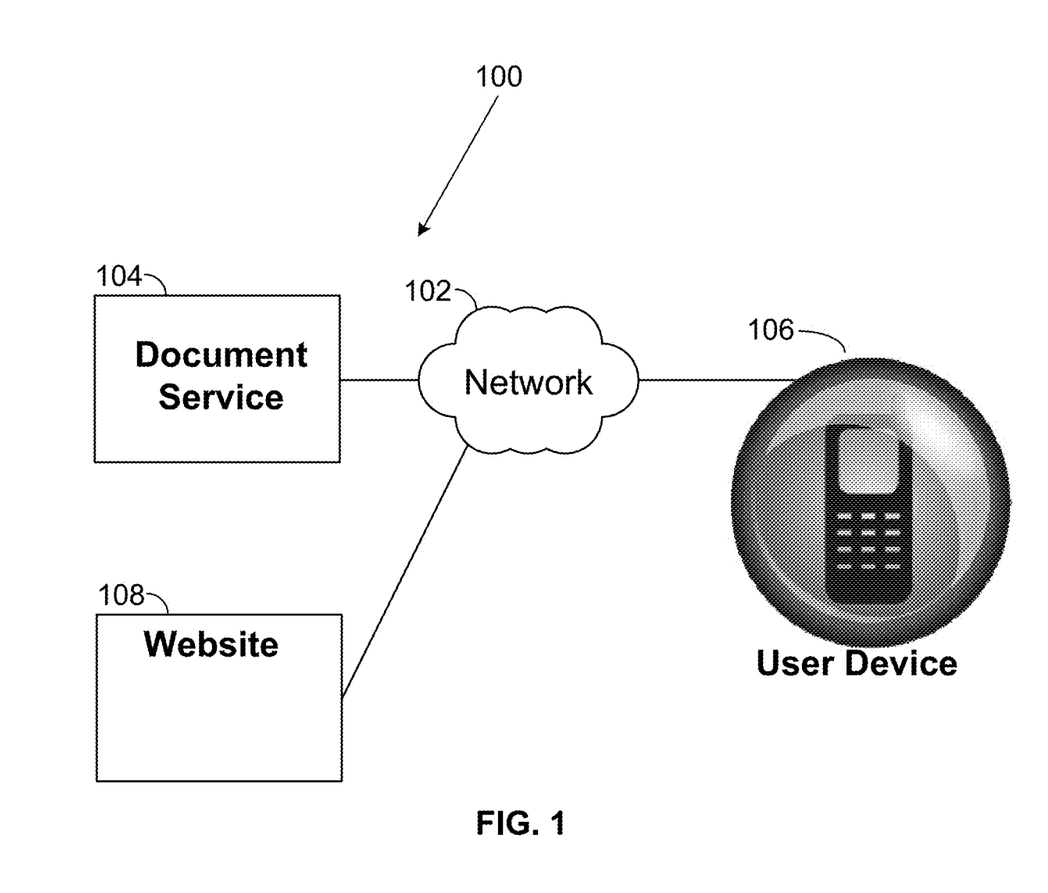
FIG. 1 shows a communication system that may be used to provide online services in accordance with an embodiment.

FIG. 1 shows a communication system 100 that may be used to provide online services in accordance with an embodiment. Communication system 100 includes a network 102, a document service 104, and a user device 106. Communication system 100 may include more than one user device.

In the exemplary embodiment of FIG. 1, network 102 is the Internet. In other embodiments, network 102 may include one or more of a number of different types of networks, such as, for example, an intranet, a local area network (LAN), a wide area network (WAN), a wireless network, a Fibre Channel-based storage area network (SAN), or Ethernet. Other networks may be used. Alternatively, network 105 may include a combination of different types of networks.

Communication system 100 also includes a website 108. In one embodiment, document service 104 may host website 108 that can be accessed by user device 106. Document service 104 may comprise a server. In an alternative embodiment, website 108 may be hosted by a different server. Document service 104 via website 108 provides user device 106 access to various webpages. In one embodiment, website 108 provides to user device 106 access to one or more webpages containing a document, such as document 308, shown in FIG. 3. User device 106 may access a World Wide Web page on website 108 that may be viewed using a conventional Web browser, for example. In one embodiment, a user using user device 106 may access website 108 to view a document containing various features or document elements including chemical formulas for a new medication the user is developing. The terms features and document elements are used interchangeably herein.

User device 106 may be any device that enables a user to view website 108 via network 102. User device 106 may be connected to network 102 through a direct (wired) link, or in the illustrated embodiment, wirelessly. User device 106 may have a display screen (not shown) for displaying information. For example, user device 106 may be a personal computer, a laptop computer, a workstation, a mainframe computer, etc. In the illustrated embodiment, user device 106 may be a mobile communication device such as a wireless phone, a personal digital assistant, cellular device, a laptop computer, a netbook, a tablet device, etc. Other devices may be used.

Figure 2:
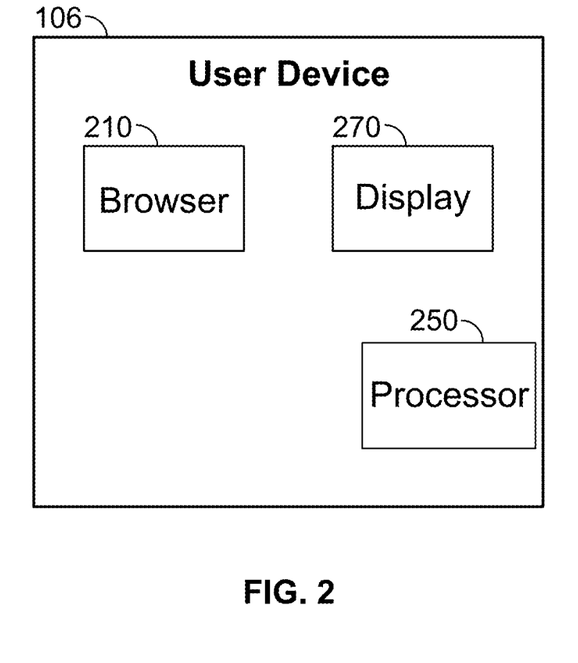
FIG. 2 shows functional components of an exemplary user device in accordance with an embodiment.

FIG. 2 shows functional components of user device 106 in accordance with an embodiment. In the exemplary embodiment of FIG. 1, user device 106 is a mobile device. For example, user device 106 may be a cellular phone. User device 106 includes a web browser 210 and a display 270. Web browser 210 may be a conventional web browser used to access World Wide Web sites via the Internet, for example. Display 270 displays, documents, text, images, software applications, webpages, and other information. For example, all or a portion of document 308 may be displayed on display 270.

Figure 3:
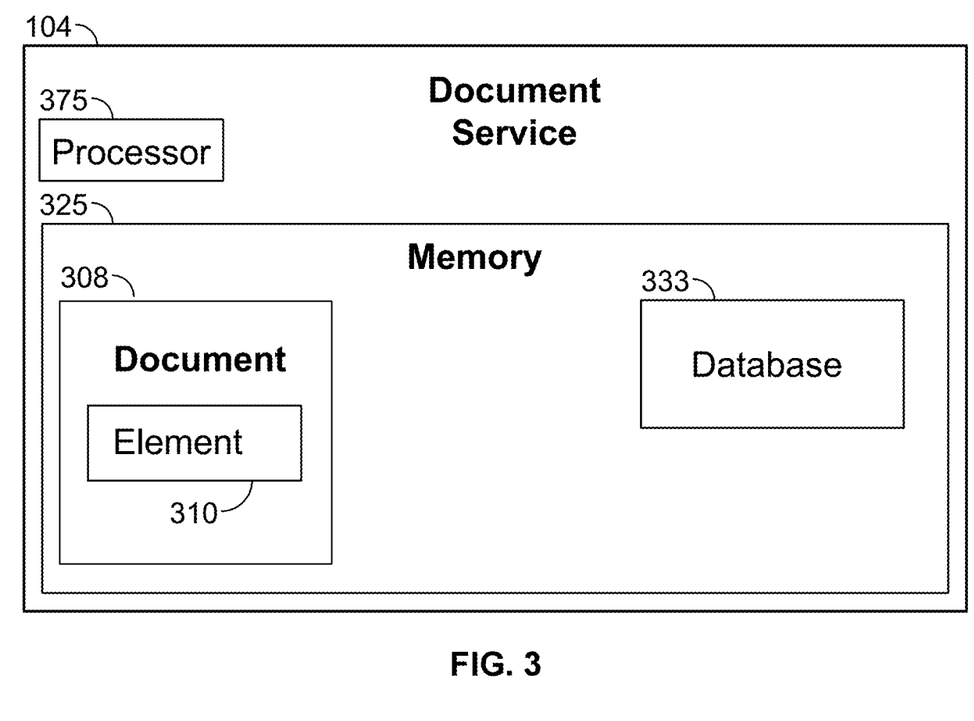
FIG. 3 shows functional components of an exemplary document service in accordance with an embodiment.

FIG. 3 shows functional components of document service 104 in accordance with an embodiment. Document service 104 includes a processor 375 and a memory 325. Document service 104 may include other components not shown in FIG. 3. Memory 325 stores document 308 and a database 333. Document 308 contains document element 310. In an alternative embodiment, document 308 and database 333 may be stored external to document service 104.

Figure 4:
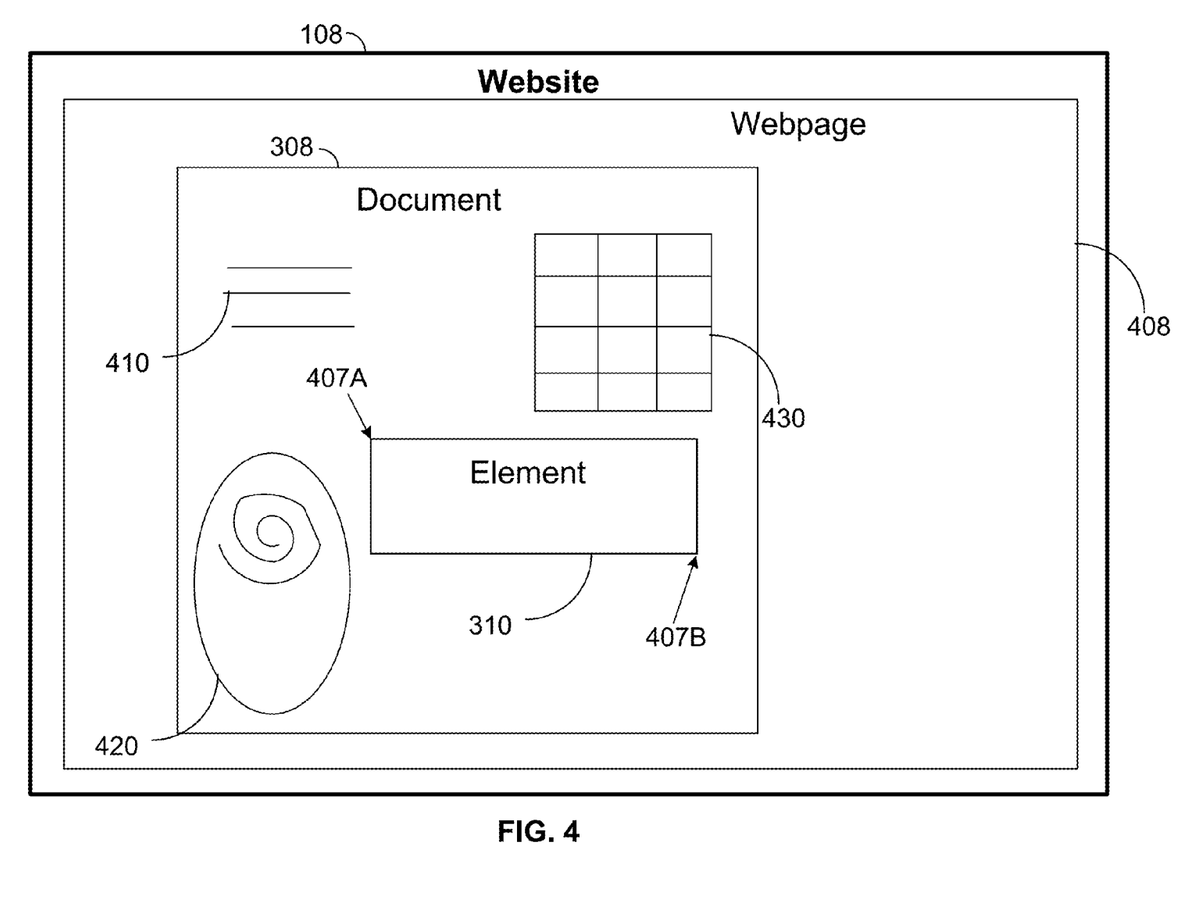
FIG. 4 shows a document displayed on a webpage in accordance with an embodiment.

FIG. 4 shows document 308 displayed on a webpage 408 in accordance with an embodiment. Webpage 408 is a part of website 108 and can be accessed by a user of mobile device 106. Document 308 may include one or more document elements and one or more of these document elements may be unrecognizable to a user device accessing the document. In the illustrative embodiment shown by FIG. 4, document 308 includes document element 310, text element 410, image element 420, and chart element 430. According to an embodiment, document element 310 may be a spreadsheet element, a chart element, a text element, a drawing element, a photograph or an image element, a chart element, a table element, a video element, etc. Specifically, a text element may include characters of a language (e.g. Chinese characters, Arabic characters, Greek characters, Sanskrit characters, etc.), a formula, a symbol, or other characters.

Suppose that a scientist in California is developing a chemical formulation for a new medication. The scientist creates a document containing the chemical formulation and process for making the medicine at his desktop computer in his laboratory. The scientist flies to Sweden for a conference and wants to access the document using his mobile device on the airplane and revise the last process of making the medication. He therefore uses user device 106 and attempts to access document 308. The steps taken by the scientist to access his document using a mobile device will be described with reference to FIG. 5.

Figure 5:
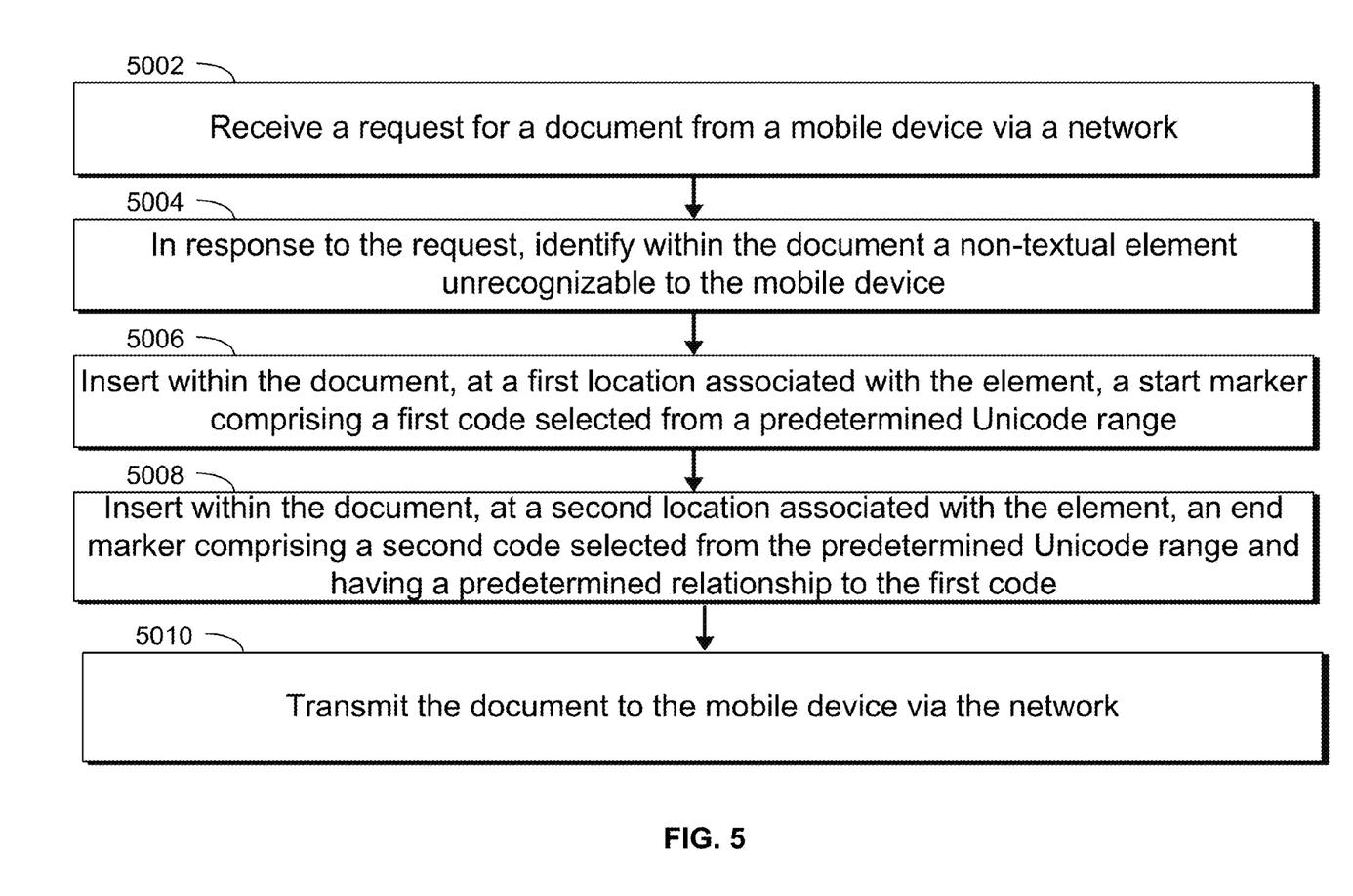
FIG. 5 is a flowchart depicting a method of identifying and denoting elements within a document in accordance with an embodiment.

FIG. 5 is a flowchart depicting a method of identifying and denoting document elements within a document in accordance with an embodiment. At step 5002, a request for a document is received from a mobile device via a network. The request for document 308 may be received at document service 104 from user device 106 via network 102. In one embodiment, suppose that the scientist is using a mobile device which requests to view the document.

At step 5004, in response to the request, a non-textual document element unrecognizable to the mobile device is identified within the document. The non-textual document element (e.g. document element 310) within document 308 is determined to be unrecognizable to user device 106. In one embodiment, suppose that document element 310 is a chemical formulation which is unrecognizable by his mobile device.

At step 5006, at a first location associated with the document element, a start marker comprising a first code selected from a predetermined Unicode range is inserted within the document. The start marker marks the beginning of the unrecognizable non-textual document element. Referring to FIG. 4, document service 104 inserts at a first location associated with the document element start marker 407A. Start marker 407A is coded using a predetermined Unicode range. In one embodiment, start marker 407A marks the beginning of the scientist's chemical formulation. In another embodiment, start marker 407A may mark the beginning of an unrecognizable image, video, chart, graph, table, photograph, etc. In one embodiment, the predetermined Unicode range is dedicated for special purposes.

In one embodiment, the predetermined Unicode used to code the start marker falls within a certain Unicode designated range. In one embodiment, the predetermined Unicode range falls between \uEC00 to \uEFFF. In this way, document service 104 encodes the start marker of document element 310 using the Unicode range. As document element 310 is not recognizable by browser 210 of user device 106, user device 106 replaces document element 310 (using the start marker and end marker) and/or inserts between the first and second location (using the start marker and end marker) associated with the non-textual document element, a graphical representation when displaying the document, as described below.

At step 5008, at a second location associated with the document element, an end marker comprising a second code selected from the predetermined Unicode range and having a predetermined relationship to the first code is inserted within the document. The end marker marks the end of the unrecognizable non-textual document element. Referring to FIG. 4, document service 104 inserts at a second location associated with the document element end marker 407B. End marker 407B is coded using the same predetermined Unicode range as start marker 407A. In one embodiment, end marker 407B is coded using a portion of the range and the Unicode range falls between \uE900 to \uEFFF. In one embodiment, the predetermined relationship is mathematical in nature and the integer Unicode value of the end marker is one less than the integer Unicode value of the start marker. In one embodiment, all start and end marker Unicode values may fall between uE900 to \uEFFF. In one embodiment, the end marker marks the end of the scientist's chemical formulation. In another embodiment, the end marker may mark the end of an unrecognizable image, video, chart, graph, table, photograph, etc.

At step 5010, the document is transmitted to the mobile device via the network. Document service 104 transmits document 308 to user device 106 via network 102. In an alternative embodiment, document 308 may be provided to user device 106 and displayable to user device 106 via website 108.

User device 106 determines that there are one or more document elements 310 within document 308, as the document elements are coded using the predetermined Unicode range. User device 106 may replace document element 310 with a box. For example, the box may be a graphical representation created using HTML code having a grey background and an ellipsis within it's borders.

Suppose that the scientist wants to show his friend on the airplane the process steps of how the medicine is created. The scientist shows his friend the document on his mobile device and the friend can clearly see the process steps of how the medicine is made, with the unrecognizable text (e.g. the chemical formulation, etc.) being replaced by the grey box encircling the ellipsis.

Single Marker

Certain document elements do not require a start and end marker. In one embodiment, certain document elements can be coded using a single marker. In one embodiment, the single marker falls in between the Unicode range \uE900 to \uEBFF.

Suppose now that the scientist has arrived at his destination in Sweden and accesses the document containing the formula and process for creating his medication using his laptop computer. The scientist wants to reduce the potency of chemical "A" in his medication as his colleagues have hypothesized that chemical "A", in potent amounts, causes brain damage in rat test subjects. The scientist accesses document 308 and changes the measurement of chemical "A" to ¼. In this embodiment, the document element "¼" is not recognizable by mobile browser 210 of user device 106 accessing the document. Document service 104 realizes that mobile browser 210 is unable to interpret the document element "¼". Therefore, document service 104 places a single marker to code document element "¼" using Unicode. In this way, when user device 106 displays document 308 to the scientist (or another user), document element "¼" having a single marker coded using Unicode, is replaced by the box having an ellipsis, as described above.

Examples of document elements which use a single marker may be textual or non-textual document elements. Some examples include characters, symbols, etc.

Multiple Document Elements

Figure 6A:
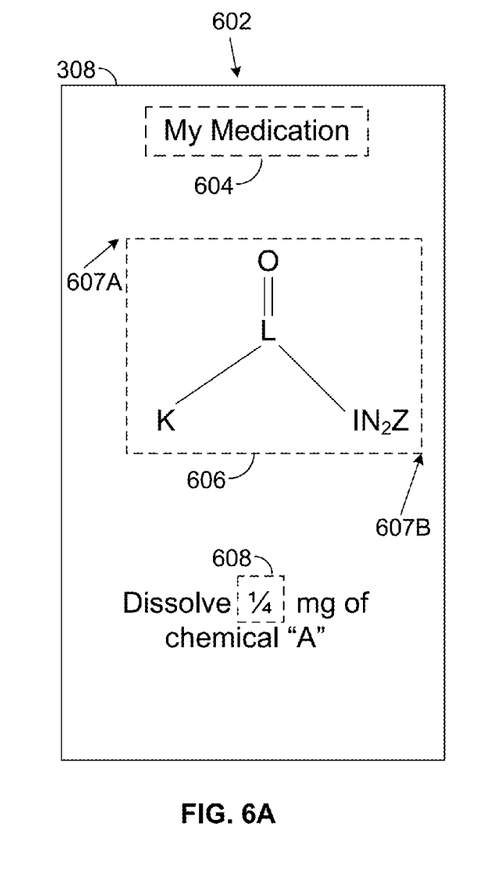
FIG. 6A shows a document displayed on a webpage in accordance with an embodiment.

FIG. 6A shows a document displayed on a webpage in accordance with an embodiment. In the exemplary embodiment, FIG. 6A shows document 308 comprising a plurality of document elements 604, 606 and 608 displayed on a webpage 602. Document elements 604, 606 and 608 are outlined for exemplary purposes only and the outline may be not be visible to a user accessing webpage 602 using user device 106. Webpage 602 may be a part of website 108. In FIG. 6A, document elements within document 308 are displayed and viewable by a browser (e.g. a desktop computer's browser). According to the exemplary embodiment, document 308 is created by the scientist to show the chemical formula and process for creating a new medication. Document element 606 is a chemical formula. Start marker 607A is located at a first location and end marker 607B is located at a second location within document 308. Start marker 607A and end marker 607B may be located anywhere within document element 606 and the top left and bottom right locations of start marker 607A and end marker 607B, respectively, are shown for exemplary purposes only. The chemical formula within document element 606 may be a drawing, an image, etc. Also within document 308 is document element 608 which displays the numerical value "¼".

Figure 6B:
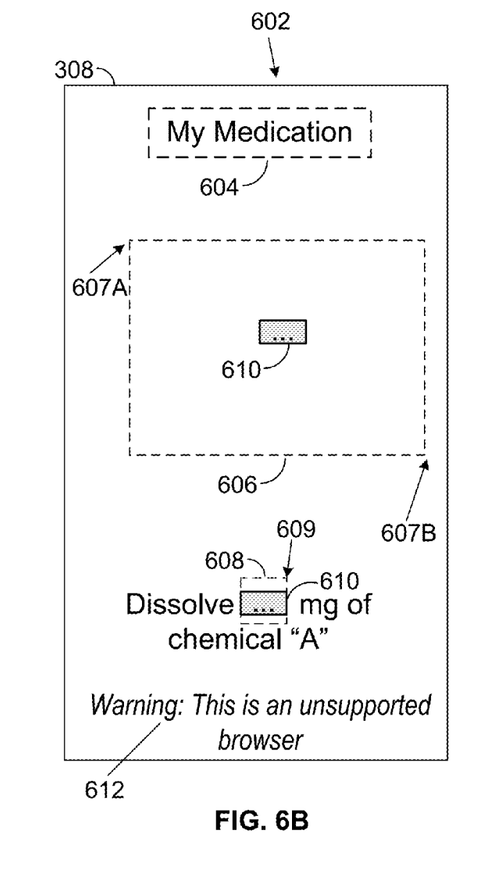
FIG. 6B shows the document of FIG. 6A displayed on a webpage viewed using a mobile device browser, in accordance with an embodiment.

FIG. 6B shows the document of FIG. 6A displayed on a webpage viewed using a mobile device browser in accordance with an embodiment. Some document elements of document 308 are unrecognizable by mobile device browser 210. In the exemplary embodiment, these unrecognizable document elements include document element 606 and 608. Start marker 607A marks a first location indicative of the beginning of the unrecognizable document element. In one embodiment, start marker 607A is coded using a predetermined Unicode range and end marker 607B is coded using a Unicode value that is one integer value less than the value of start marker 607A. In other words, the code for start marker 607A has a first value and the code for end marker 607B has a second value that is one less than the first value. In one embodiment, start marker 607A may be odd while end marker 607B is even. Therefore, a predetermined relationship between start marker 607A and end marker 607B is that the integer value of start marker 607A is one greater than the integer value of end marker 607B. Other relationships between the start and end markers may exist.

Figure 7:
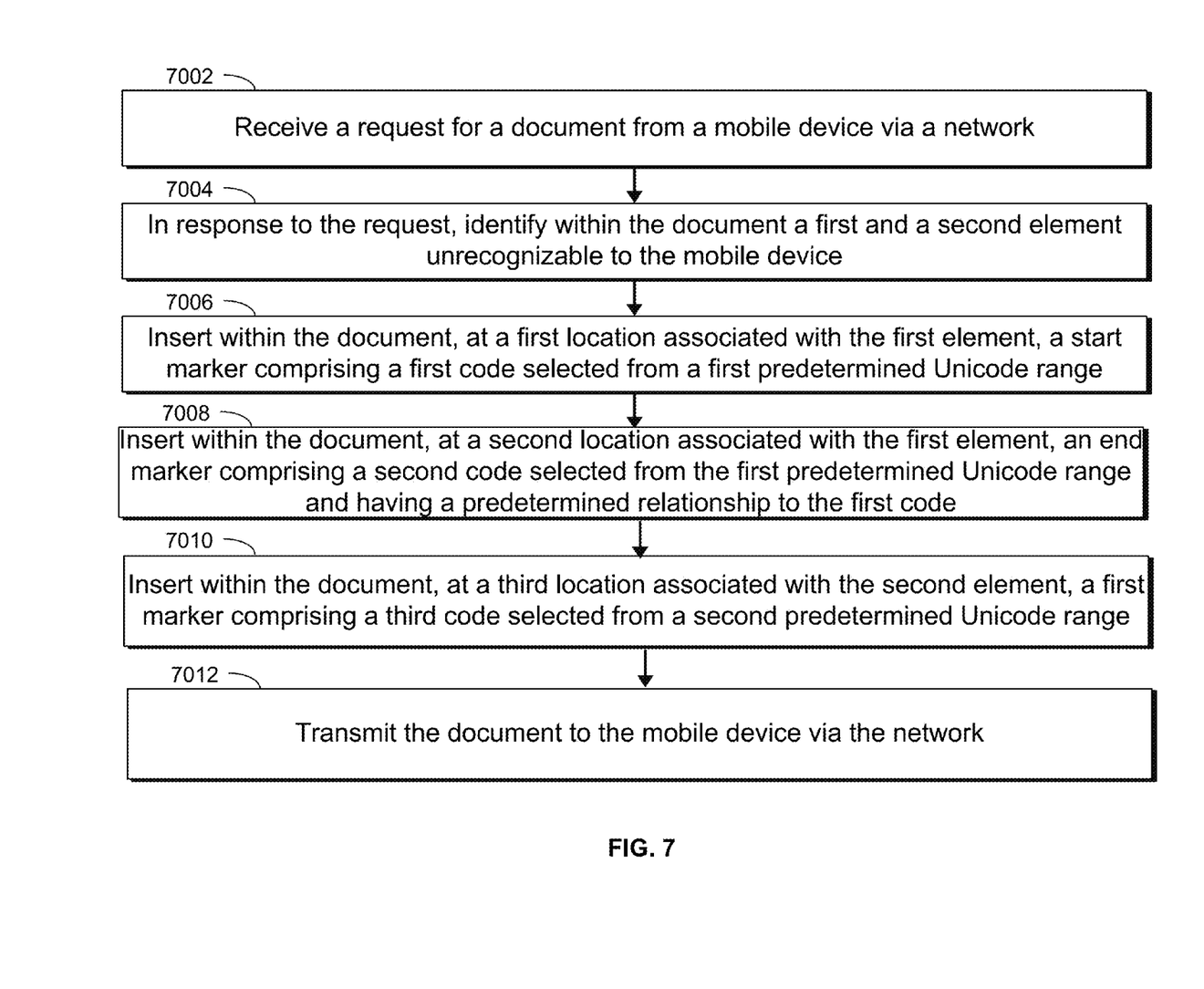
FIG. 7 is a flowchart depicting a method of identifying and denoting various unrecognizable document elements within a document in accordance with an embodiment.

FIG. 7 is a flowchart depicting a method of identifying and denoting various unrecognizable document elements within a document in accordance with an embodiment. The steps of FIG. 7 will be described herein by referencing FIGS. 6A and 6B.

At step 7002, a request for a document is received from a mobile device via a network. The request for document 308 may be received at document service 104 from user device 106 via network 102.

At step 7004, in response to the request, a first and a second document element unrecognizable to the mobile device are identified within the document. In the illustrative embodiment in FIG. 6B, first and second unrecognizable document elements 606 and 608, respectively, are unrecognizable to user device 106 and are identified by document service 104 within document 308.

At step 7006, at a first location associated with the first document element, a start marker comprising a first code selected from a predetermined Unicode range is inserted within the document. Start marker 607A marks the beginning of first unrecognizable document element 606. Document service 104 inserts at a first location associated with first document element 606, start marker 607A. Start marker 607A is coded using a predetermined Unicode range. In one embodiment, start marker 607A marks the beginning of the scientist's chemical formulation. In another embodiment, start marker 607A may mark the beginning of an unrecognizable image, video, chart, graph, table, photograph, etc.

As described above, in one embodiment, the predetermined Unicode used to code start marker 607A falls within a certain Unicode designated range. In one embodiment, the predetermined Unicode range falls between \uEC00 to \uEFFF. In this way, document service 104 encodes start marker 607A using the Unicode range. As document element 606 is not recognizable by browser 210 of user device 106, user device 106 replaces document element 606 (using start marker 607A and end marker 607B) with a graphical representation 610.

At step 7008, at a second location associated with the first document element, an end marker comprising a second code selected from the predetermined Unicode range and having a predetermined relationship to the first code is inserted within the document. End marker 607B marks the end of first unrecognizable document element 606. Document service 104 inserts at a second location associated with first document element 606, end marker 607B. End marker 607B is coded using the same predetermined Unicode range as start marker 607A. In one embodiment, end marker 607B is coded using a portion of the range and the Unicode falls between \uE900 to \uEFFF. In one embodiment, the predetermined relationship is mathematical in nature and the integer value of end marker 607B is one less than the integer value of start marker 607A. In one embodiment, all start and end marker Unicode values may fall between \uE900 to \uEFFF. In one embodiment, end marker 607B marks the end of the scientist's chemical formulation. In another embodiment, end marker 607B may mark the end of an unrecognizable image, video, chart, graph, table, photograph, etc.

At step 7010, at a third location associated with the second document element, a first marker comprising a third code selected from a second predetermined Unicode range in inserted within the document. Document service 104 inserts at a third location associated with second document element 608, first marker 609. First marker 609 is coded using the second predetermined Unicode range. In one embodiment, the second predetermined Unicode range is between \uE900 to \uEBFF. The location of first marker 609 in FIG. 6B is shown for exemplary purposes only and the location may be placed anywhere.

At step 7012, the document is transmitted to the mobile device via the network. Document service 104 transmits document 308 to user device 106 via network 102. In an alternative embodiment, document 308 may be provided to user device 106 and displayable to user device 106 via website 108 comprising webpage 602.

In the embodiment depicted by FIG. 6B, unrecognizable document elements 606 and 608 are replaced by graphical representation 610. For example, graphical representation 610 may include a box having an ellipsis inside. Thus, the mobile device inserts at a first and a second location associated with document element 606, first graphical representation 610 when displaying the document. The mobile device inserts at a third location associated with document element 608, a second graphical representation 610 being substantially similar to or the same as first graphical representation 610 when displaying the document. Referring back to the scientist, suppose now that the scientist is viewing document 308 on a mobile device. The scientist can view all recognizable document elements within document 308 and any unrecognizable document elements are replaced by graphical representation 610. In this way, recognizable and unrecognizable document elements (represented by graphical representation 610) within document 308 are provided to the scientist.

In one embodiment, an indication 612 may inform the user of user device 106 that he/she is using a non-supported browser to view document 308.

In various embodiments, the method steps described herein, including the method steps described in FIGS. 5 and 7, may be performed in an order different from the particular order described or shown. In other embodiments, other steps may be provided, or steps may be eliminated, from the described methods.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIGS. 5 and 7. Certain steps of the methods described herein, including one or more of the steps of FIGS. 5 and 7, may be performed by a server or by another processor in a network-based cloud-computing system. Certain steps of the methods described herein, including one or more of the steps of FIGS. 5 and 7, may be performed by a client computer in a network-based cloud computing system. The steps of the methods described herein, including one or more of the steps of FIGS. 5 and 7, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIGS. 5 and 7, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 8:
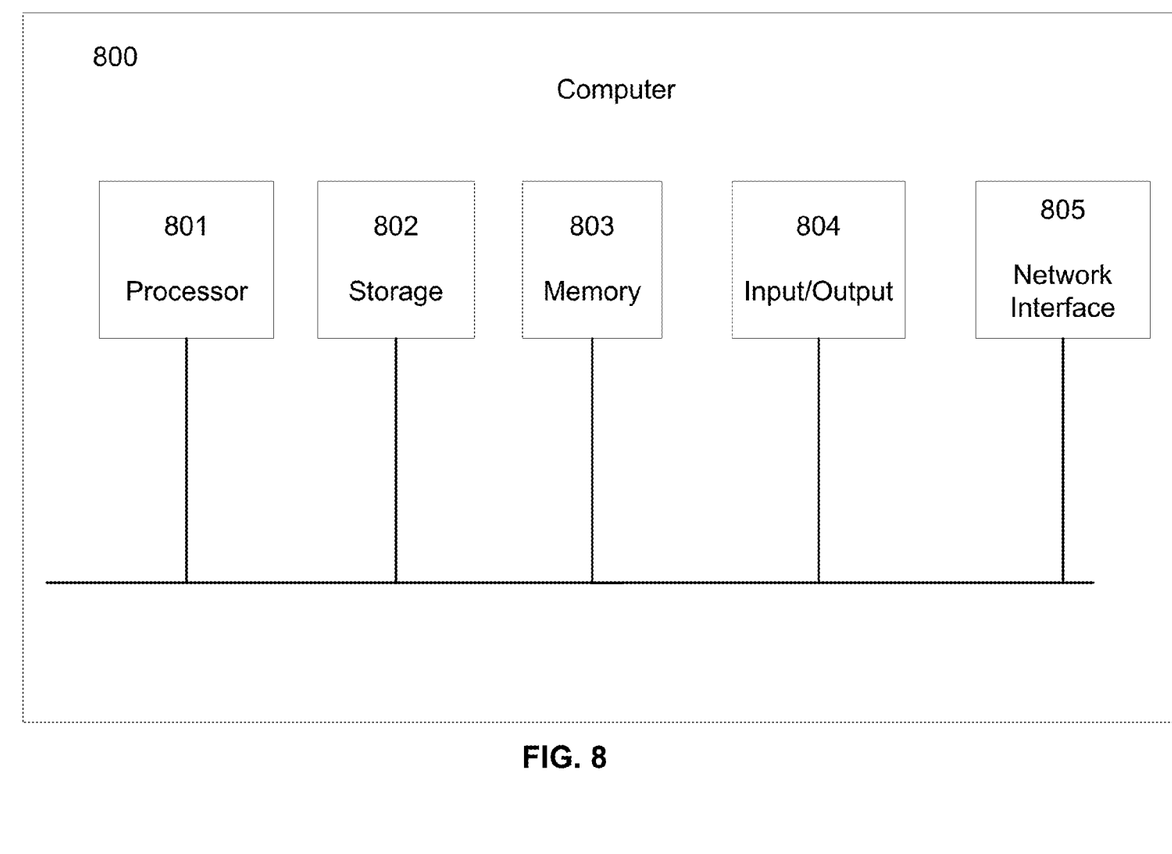
FIG. 8 shows components of a computer that may be used to implement the invention.

A high-level block diagram of an exemplary computer that may be used to implement systems, apparatus and methods described herein is illustrated in FIG. 8. Computer 800 includes a processor 801 operatively coupled to a data storage device 802 and a memory 803. Processor 801 controls the overall operation of computer 800 by executing computer program instructions that define such operations. The computer program instructions may be stored in data storage device 802, or other computer readable medium, and loaded into memory 803 when execution of the computer program instructions is desired. Thus, the method steps of FIGS. 5 and 7 can be defined by the computer program instructions stored in memory 803 and/or data storage device 802 and controlled by the processor 801 executing the computer program instructions. For example, the computer program instructions can be implemented as computer executable code programmed by one skilled in the art to perform an algorithm defined by the method steps of FIG. FIGS. 5 and 7. Accordingly, by executing the computer program instructions, the processor 801 executes an algorithm defined by the method steps of FIGS. 5 and 7. Computer 800 also includes one or more network interfaces 804 for communicating with other devices via a network. Computer 800 also includes one or more input/output devices 805 that enable user interaction with computer 800 (e.g., display, keyboard, mouse, speakers, buttons, etc.).

Processor 801 may include both general and special purpose microprocessors, and may be the sole processor or one of multiple processors of computer 800. Processor 801 may include one or more central processing units (CPUs), for example. Processor 801, data storage device 802, and/or memory 803 may include, be supplemented by, or incorporated in, one or more application-specific integrated circuits (ASICs) and/or one or more field programmable gate lists (FPGAs).

Data storage device 802 and memory 803 each include a tangible non-transitory computer readable storage medium. Data storage device 802, and memory 803, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 805 may include peripherals, such as a printer, scanner, display screen, etc. For example, input/output devices 805 may include a display device such as a cathode ray tube (CRT) or liquid crystal display (LCD) monitor for displaying information to the user, a keyboard, and a pointing device such as a mouse or a trackball by which the user can provide input to computer 800.

Any or all of the systems and apparatus discussed herein, including document service 104, user device 106, and components thereof, including web browser 210, display 270, processor 375, and memory 325, may be implemented using a computer such as computer 800.

One skilled in the art will recognize that an implementation of an actual computer or computer system may have other structures and may contain other components as well, and that FIG. 8 is a high level representation of some of the components of such a computer for illustrative purposes.

In one embodiment, user device 106 may access document 308 by selecting and/or clicking on an address such as a Uniform Resource Locator (URL). In one embodiment, a link representing the URL to the scientist new medication formulation document and process may be used to access the document.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method comprising:
receiving a request for a document from a mobile device via a network;
in response to the request, identifying within the document a non-textual document element unrecognizable to the mobile device;
inserting within the document, at a first location associated with the non-textual document element, a start marker comprising a first code selected from a predetermined Unicode range;
inserting within the document, at a second location associated with the non-textual document element, an end marker comprising a second code selected from the predetermined Unicode range and having a predetermined relationship to the first code, wherein the predetermined Unicode range falls between \uE900 to \uEFFF; and
transmitting the document to the mobile device via the network.

2. The method of claim 1 further comprising:
identifying within the document a textual document element unrecognizable to the mobile device; and
inserting within the document, at a third location associated with the textual document element, a single marker comprising a third code selected from a second predetermined Unicode range.

3. The method of claim 1 wherein the mobile device inserts between the first and second locations associated with the non-textual document element a graphical representation when displaying the document.

4. The method of claim 3 wherein the document is displayed to a user using the mobile device via a webpage.

5. The method of claim 1 wherein the predetermined Unicode range is dedicated for special purposes.

6. The method of claim 1 wherein the non-textual document element comprises one of:

an image;
a photograph;
a video;
a chart;
a table; and
a graph.

7. The method of claim 1 wherein the first code has a first value and the second code has a second value that is one less than the first value.

8. The method of claim 1 wherein the first code is an odd number and the second code is an even number.

9. A method comprising:
   receiving a request for a document from a mobile device via a network;
   in response to the request, identifying within the document first and second document elements unrecognizable to the mobile device;
   inserting within the document, at a first location associated with the first document element, a start marker comprising a first code selected from a first predetermined Unicode range;
   inserting within the document, at a second location associated with the first document element, an end marker comprising a second code selected from the first predetermined Unicode range and having a predetermined relationship to the first code;
   inserting within the document, at a third location associated with the second document element, a first marker comprising a third code selected from a second predetermined Unicode range, wherein the first predetermined Unicode range falls between \uE900 to \uEFFF and the second predetermined Unicode falls between \uE900 to \uEBFF; and
   transmitting the document to the mobile device via the network.

10. The method of claim 9 wherein the mobile device inserts between the first and second location associated with the first document element a first graphical representation and inserts at the third location associated with the second document element a second graphical representation substantially similar to the first graphical representation when displaying the document.

11. The method of claim 10 wherein the document is displayed to a user using the mobile device via a webpage.

12. The method of claim 9 wherein the first and second predetermined Unicode ranges are dedicated for special purposes.

13. A non-transitory computer readable medium having program instructions stored thereon, the instructions capable of execution by a processor and defining the steps of:
   receiving a request for a document from a mobile device via a network;
   in response to the request, identifying within the document a non-textual document element unrecognizable to the mobile device;
   inserting within the document, at a first location associated with the non-textual document element, a start marker comprising a first code selected from a predetermined Unicode range;
   inserting within the document, at a second location associated with the non-textual document element, an end marker comprising a second code selected from the predetermined Unicode range and having a predetermined relationship to the first code, wherein the predetermined Unicode range falls between \uE900 to \uEFFF; and
   transmitting the document to the mobile device via the network.

14. The non-transitory computer readable medium of claim 13, further comprising instructions defining the step of:
   identifying within the document a textual document element unrecognizable to the mobile device; and
   inserting within the document, at a third location associated with the textual document element, a single marker comprising a third code selected from a second predetermined Unicode range.

15. The non-transitory computer readable medium of claim 13, wherein the mobile device inserts between the first and second location associated with the non-textual document element a graphical representation when displaying the document.

16. The non-transitory computer readable medium of claim 15, wherein the document is displayed to a user using the mobile device via a webpage.

17. The non-transitory computer readable medium of claim 13, wherein the predetermined Unicode range is dedicated for special purposes.

18. The non-transitory computer readable medium of claim 13, wherein the non-textual document element comprises one of:
   an image;
   a photograph;
   a video;
   a chart;
   a table; and
   a graph.

19. The non-transitory computer readable medium of claim 13, wherein the first code has a first value and the second code has a second value that is one less than the first value.

20. The non-transitory computer readable medium of claim 13, wherein the first code is an odd number and the second code is an even number.

* * * * *